June 29, 1965     I. I. SOLZMAN     3,191,517
VENTILATING SYSTEM FOR FALLOUT SHELTER
Filed Oct. 27, 1961     4 Sheets-Sheet 1

INVENTOR
ISEL I. SOLZMAN

BY Cushman, Darby & Cushman
ATTORNEYS

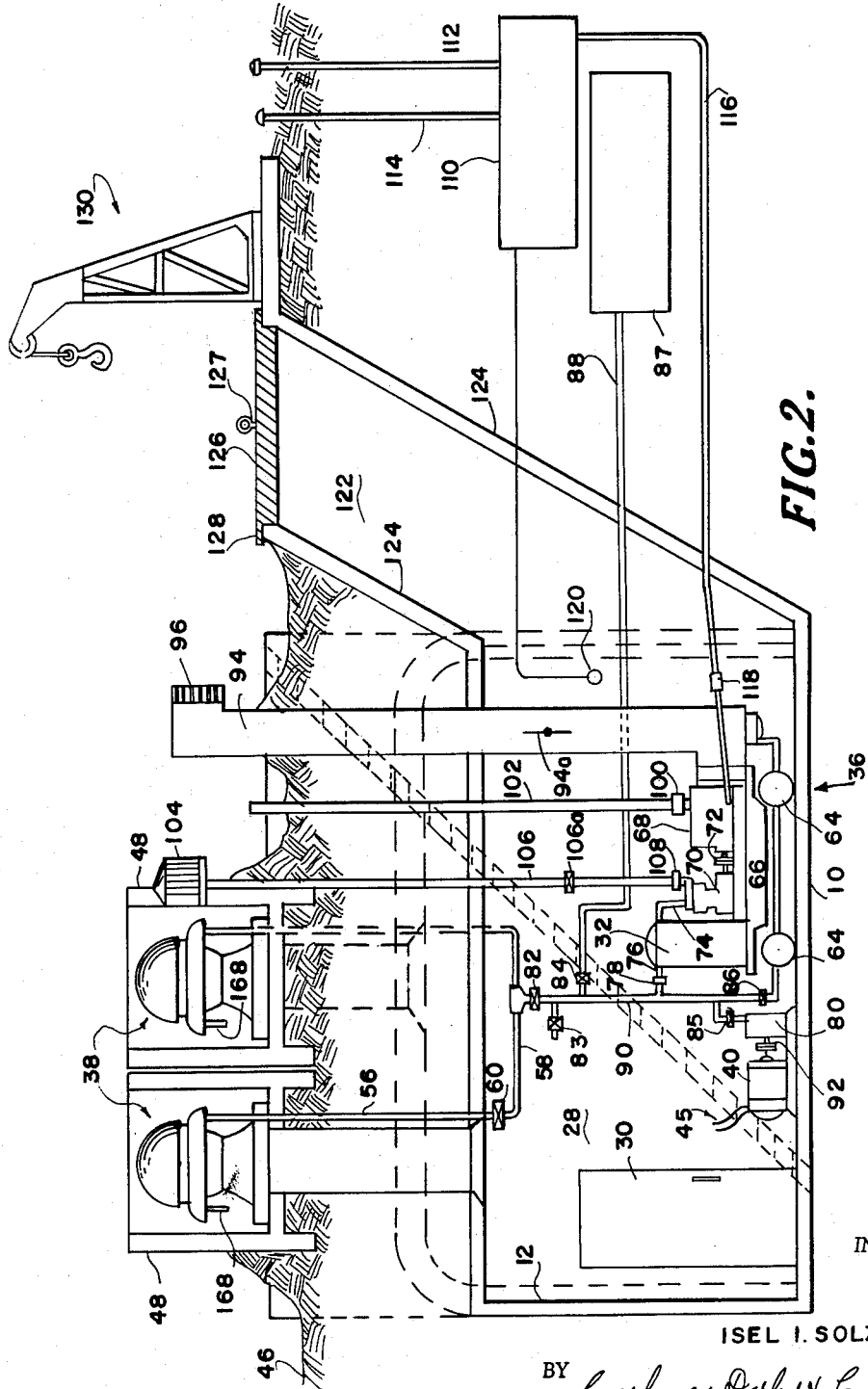

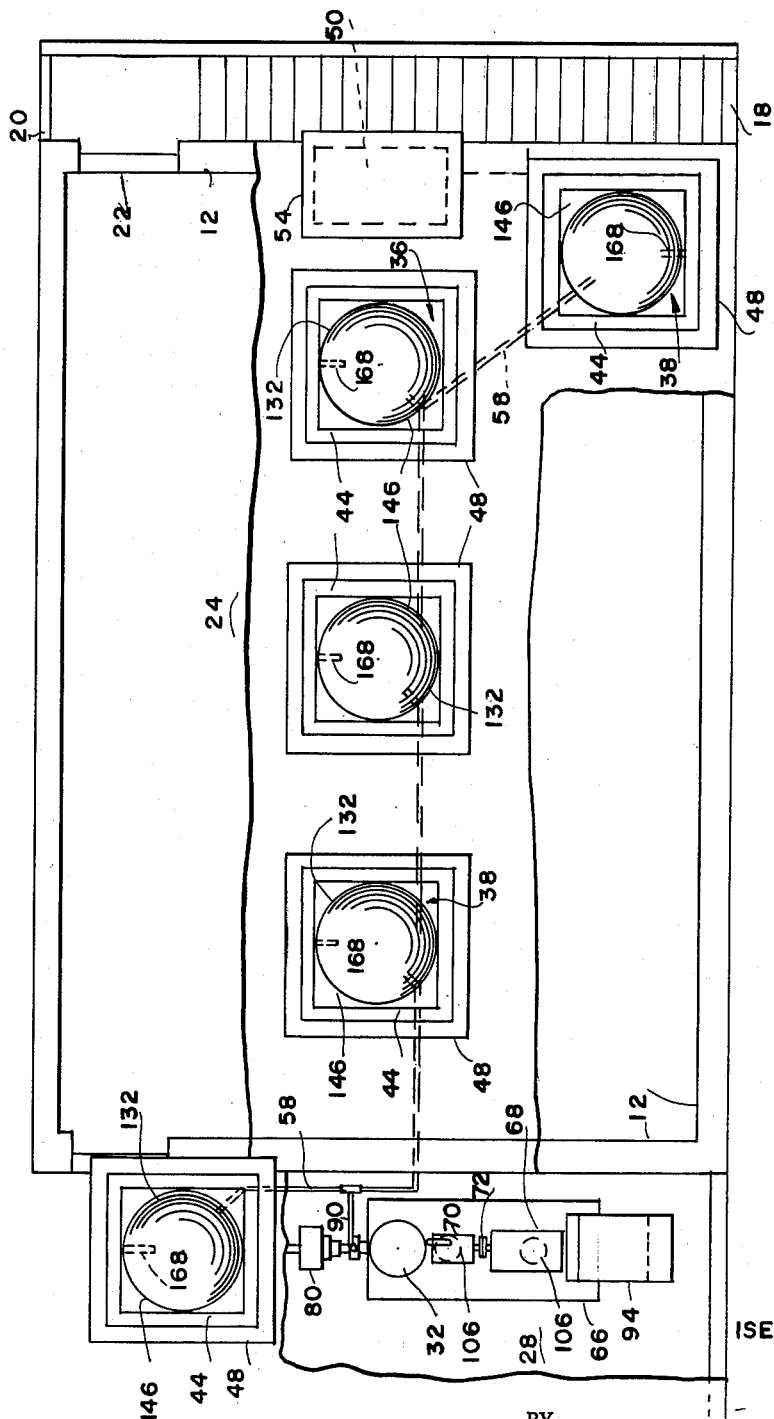

June 29, 1965     I. I. SOLZMAN     3,191,517
VENTILATING SYSTEM FOR FALLOUT SHELTER
Filed Oct. 27, 1961     4 Sheets-Sheet 4

INVENTOR
ISEL I. SOLZMAN

BY Cushman, Darby & Cushman
ATTORNEYS

United States Patent Office 3,191,517
Patented June 29, 1965

3,191,517
VENTILATING SYSTEM FOR FALLOUT SHELTER
Isel I. Solzman, 4108 Dodge St., Omaha, Nebr.
Filed Oct. 27, 1961, Ser. No. 148,143
4 Claims. (Cl. 98—33)

The present invention relates to shelter structures for protecting persons from radiation from the source known as radioactive fallout and from other effects of a nuclear disaster. In particular, it relates to providing such structures with a ventilating system and with a power producing system for operating ventilator fans and electric cooking and lighting facilities.

It is the primary object of the present invention to provide a shelter structure with a power producing system which is simple and effective yet flexible to meet varying demands of ventilating, cooking and lighting systems.

It is a further object to provide a shelter structure, as economically as possible, with a power producing system for supplying energy to ventilating, cooking and lighting equipment.

It is a further object to provide a shelter structure with a ventilating system the ventilating capacity of which is simply and economically controlled so as to allow energy to be directed to other uses when desired.

Broadly these and other objects and advantages are realized in the present invention by providing a shelter structure, in particular, a fallout shelter with air-operated ventilating fans and with air-compressing means for operating the fans and other equipment if present. The advantages of this system include independence from a remote power source, economy, simplicity and flexibility of operation and safety as will become apparent from a reading of the following specification taken in conjunction with the drawings.

In the drawings:

FIGURE 2 is an end elevational view, partly in section, of the fallout shelter of FIGURE 1, slightly modified.

FIGURE 3 is a top plan view of the fallout shelter of FIGURE 2.

Figure 1:
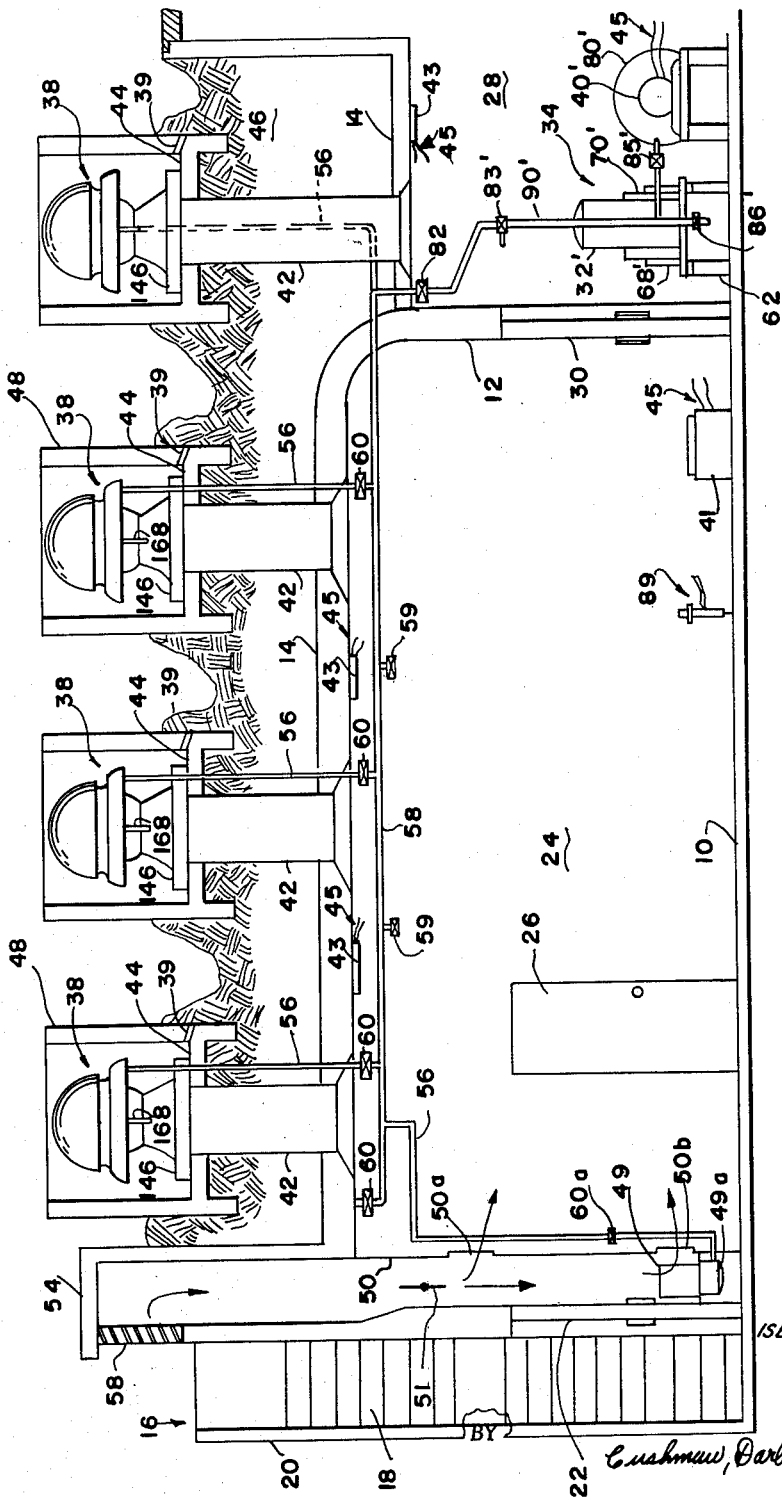
FIGURE 1 is a side elevational view, partly in section, of a fallout shelter embodying the principles of the present invention.

Basically, a fallout shelter is a building constructed so as to shield the interior thereof from an external radiation source and providing minimum facilities for the safe and sanitary living of persons therein. Conventionally, the shelter is constructed with concrete walls and is located below ground so as to take advantage of the radiation shielding provided by the earth. Entryways are constructed with one or more mutually off-set sections in order to form labyrinths preventing the streaming of radiation into the shelter. The extent of facilities for ventilation, sanitation, eating and sleeping provided within the shelter will depend on such variables as the number of persons to be accommodated, the expected duration of habitation and most important, the amount of money invested in the shelter.

The fallout shelter illustrated somewhat schematically in the drawings includes a floor 10, side walls 12, and a ceiling 14, all of cement, and constructed in any suitable manner as from precast cement units or by casting in place. As shown, the shelter is located below ground and is entered by way of a stairwell 16 adjacent one of the side walls 12 and having a flight of stairs 18 enclosed in a cement well 20. At the bottom of the stairwell 16 is a door 22 leading into the main shelter area 24 in which appropriate sitting and sleeping facilities (not shown) are provided. Sanitation facilities (not shown), preferably including chemical toilets, are provided in a separate area communicating with the main area 24 through a door 26. A third area 28 communicates with the main shelter area 24 through a door 30 and is provided with whatever power producing equipment is selected for use with the shelter.

According to the principles of the present invention, power for the shelter will be provided by one or more conventional air compressor systems driven by gasoline or diesel engines. These compressor systems including air accumulators 32 may be of the permanently installed type, illustrated at 34 in FIGURE 1, or the mobile type illustrated at 36 in FIGURE 2. Compressed air from these systems is used in combination with suitable air motors to operate the shelter ventilation system and other equipment. Additionally, the air may be released directly into the shelter from the accumulators to provide air for breathing if necessary.

In the shelter illustrated, one or more air-operated ventilator exhaust units 38 are located above ground with their inlets communicating by means of ducts 42 through the ceiling 14 with the living area 24 and power area 28. The exhaust fans 38 may be of the type described in U.S. Patents Nos. 2,526,290 and 2,987,983 modified to the extent of having air motors in lieu of electric motors for the operation thereof. Conveniently, each fan and air motor unit 38 may be mounted on a cement slab 44 set into the surface of the ground 46. Vertical cement walls 48 may be provided, if desired, around the unit for protection from mechanical injury and radiation. A suitable drain 39 in the walls 48 surrounding each unit presents rain water from collecting within the walls.

In addition to the ventilator units 38 and exhaust ducts 42, the ventilation system includes an air inlet duct 50 communicating at its inlet end with the atmosphere through a suitable air filter 42 for trapping as much fallout as is practicable. The filter may be protected from the weather as by positioning it under a horizontal cement roof section 54 which also reduces the amount of radiation streaming down the duct 50 when fallout is present. Preferably, the filter will be located at the side of the air duct 50 or otherwise offset from the center thereof in order to reduce streaming of radiation down the duct from fallout trapped in the filter. The duct 50 communicates with the interior of the shelter through a suitable opening 50a and is provided near its lower end with an air supply fan 49 and an air motor 49a therefor for drawing air downwardly through the duct 50 and discharging same into the living area 24 through opening 50b. A manually operated damper 51 is located in duct 50 between its inlet end and opening 50a for closing the duct when necessary.

The power system for the ventilator units 38 and motor 49a as contemplated by the present invention, includes a compressed air line 56 for delivering air pressure to each air motor and a compressed air ventilation header 58 for supplying each of the lines 56. As shown, the connections between the header 58 and lines 56 are made within the living area 24 and include manually operated valves 60 and 60a by which the occupants can control the air pressure delivered to the units 38 and motor 49a, respectively. Header 58 also communicates directly with living area 24 through valves 59.

To supply the compressed air required to operate the ventilation system the present invention contemplates a system which is low in cost, yet independent of a source of electric current and which is, therefore, not affected by a power failure. These features are found in conventional air compressors driven by gasoline or diesel engines. As pointed out above, the compressor-engine units including air accumulator tanks 32 may be permanently installed units as indicated at 34 in FIGURE 1, or may be mobile units as indicated at 36 in FIGURE 2. In the case of permanent units, they can conveniently be mounted on suitable supports 62 secured to the floor 10 of the shelter. The mobile units have wheels 64 in lieu of fixed supports 62.

As shown in FIGURES 2 and 3, a mobile compressor unit 36 includes a horizontal support frame 66 mounted on the wheels 64 and supporting a gasoline or diesel engine 68, an air compressor 70 driven by the drive shaft of the engine 68 through a suitable coupling 72 and an air accumulator tank 32 connected to the output of the compressor 70 by line 74. An air line 76 from the accumulator connects with a main air header 90 through a conventional quick disconnect coupling 78. As shown, header 90 is adapted by means of a plurality of valves 82, 83, 84, 85 and 86 to distribute air to whatever air operated equipment is present. As is apparent in FIGURE 2, ventilation header 58, referred to above, connects with main header 90 through valve 82.

As further shown in FIGURE 2, the power system of the present invention includes an electric generator 40 driven through a coupling 92 by a suitable air motor 80. The motor receives its air supply from main header 90 through valve 85. Preferably generator 40 is of the type which generates alternating current of frequencies substantially above 60 cycles per second and preferably about 400 cycles per second. For example, a suitable generator, rated at 3 kva. and readily available on the market, is one which produces single phase current of 115 volts in the range of about 400 c.p.s. to about 1225 c.p.s. when operated in the range of about 3500 r.p.m. to about 10,500 r.p.m.

In addition to the accumulator 32, the system of the present invention contemplates the use of additional air storage tanks for the purpose of supplying emergency air for breathing or for the operation of equipment. Conviently, an additional tank 87, as seen in FIGURE 2, can be buried outside the shelter and connected to main header 90 through valve 84 and a suitable line 88. While locating the tank 87 beneath the ground and outside the shelter has the advantages of providing some protection for the tank from injury and conserving space within the shelter, the tank 87 could be placed in the shelter, if desired.

In the event that it is desired to use further air operated equipment within the shelter, main header 90 may be provided with additional valves, such as illustrated at 83. It is contemplated, for example, that air-operated pumps for sewage disposal would be advantageous in the event that the shelter is supplied with water. It is further contemplated that air cylinders would be advantageous in operating the door 22 in the event that the latter is of massive construction as protection against blast or radiation. More in particular, it is contemplated that air operated digging tools should be stored inside the shelter to aid persons in escaping therefrom in the event that the normal exits become blocked. Such tools, illustrated schematically at 89, include air operated hammers and shovels and when connected to header 90 through suitable flexible air lines and valve 83 would vastly increase the chances of escape from a damaged shelter.

A suitable arrangement for supplying the engine 68 with cooling air, fuel and carburetor air, and the compressor 70 with supply air is also shown in FIGURE 2. An air duct 94 having a filter 96 at its inlet end passes through the ceiling 14 for conducting cooling and carburetor air to the engine 68. A manually operated damper 94a permits the duct to be closed, and an air-motor-driven fan 94b located in the lower end of the duct is adapted to draw air downwardly through the duct and deliver the same to the carburetor and cooling system of the engine 68. Engine exhaust is passed to the atmosphere through upwardly extending pipe 102 which is connected to the engine exhaust pipe through a quick disconnect coupling 100. An air supply pipe 106 having a valve 106a therein is provided with a filter 104 at its upper end. A quick disconnect coupling 108 connects the lower end of supply pipe 106 to the inlet of the compressor 70. A buried fuel tank 110 having fill pipe 112 and vent pipe 114 extending to the surface supplies fuel to the engine 68 through a line 116. A quick disconnect coupling 118 in the line 116 located inside the power room 28 permits ready connection of the engine to its fuel supply. A suitable fuel gauge 120 connecting with the tank 110 may be provided inside the power room 28, if desired.

In FIGURE 1, the permanently installed units 34, including air tank 32', air compressor 70' and an internal combustion engine 68' supply air and are supplied with air and fuel by lines and connections similar to those described above for the mobile units 36. The air motor 80' for operating generator 40' is connected to the tank 32' through header 90' and valve 85'. Valves 82', 83' and 86' are analogous to the similarly numbered valves in FIGURE 2.

As seen in FIGURE 2 the power room 28 communicates with the surface of the ground through an inclined ramp 122 defined by walls 124. A suitable plug-type shielding cover 126 having a lifting lug 127 fits into the upper end of the shaft 122. A laterally extending flange 128 on the cover rests on the upper edge of walls 124 to position the cover. A hand-operated hoist 130 may conveniently be positioned adjacent the upper end of shaft 122 for moving cover 126 and for raising and lowering machinery through the ramp.

Figure 4:
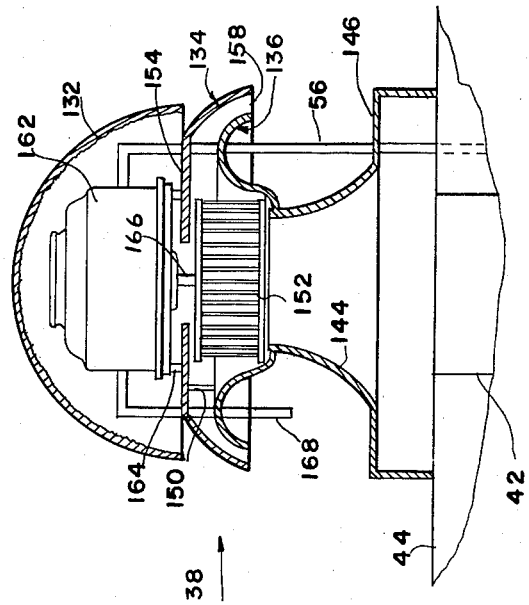
FIGURE 4 is an elevational view, partly in section, of one of the ventilators of FIGURE 1.

FIGURE 4 illustrates a suitable ventilator unit 38, such as that disclosed in Patent No. 2,987,983 modified by having an air motor substituted for the electric motor. As seen in this view, the unit 38 includes a motor housing 132, an upper fan hood 134 and a lower fan hood 136, all of which may be constructed of fiberglass. If desired, the fiberglass may have finely divided shielding material, such as lead, dispersed therein. The lower hood 136 terminates in a depending flared venturi air inlet 144, shaped to form at its lower end a horizontal base 146 which rests on support 44 and registers with duct 42 in the ceiling 14 of the shelter. The lower hood 136 is spaced from and secured to the upper hood 134 by any suitable means such as spaced brace members 150. Thus, it will be seen that the lower hood 136 coacts with the upper hood 134 to provide a chamber directly above the venturi inlet 144 in which is positioned any suitable type of fan, such as turbine fan 152, and to provide a downwardly tapered annular air discharge passage 158. The dome-shaped motor housing 132 is secured to and spaced from flat portion 154 as at 160 by any suitable bracket means (not shown).

An air motor 162 is mounted underneath the motor housing 132 on a flat portion 154 of the upper fan hood 134 by any suitable means such as circumferentially spaced members 164. The drive shaft 166 of the motor extends through an opening in portion 154 and supports at its end the fan 152. Compressed air-line 56 passes through the base 146, the fan hoods 134 and 136 and connects with the motor for driving same. An air exhaust line 168 from the motor similarly passes through the hoods 134 and 136 for exhausting air from the motor.

Figure 5:
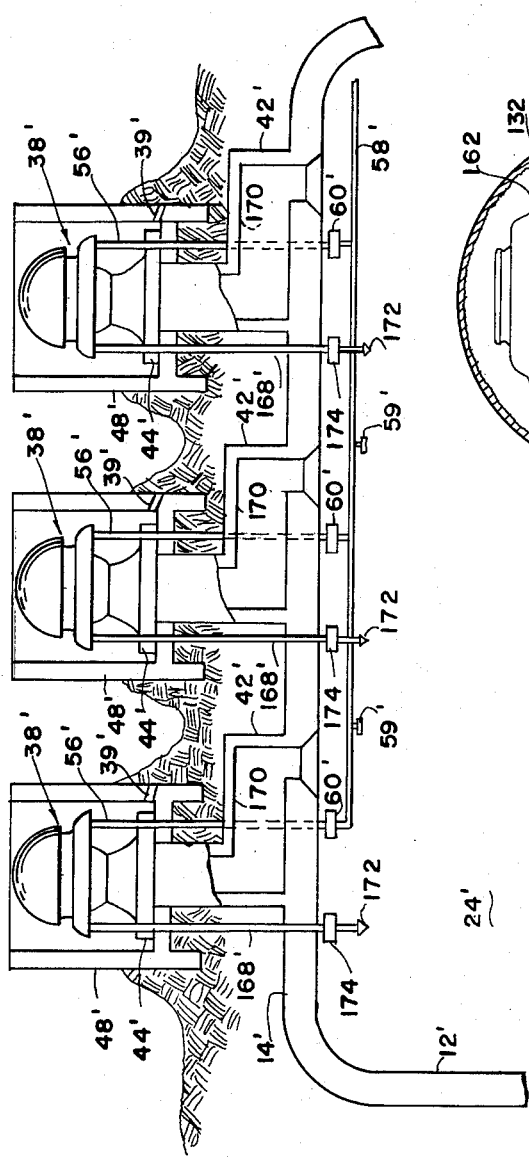
FIGURE 5 is a fragmentary side elevational view, partly in section, of a modified form of a fallout shelter.

FIGURE 5 illustrates a modified arrangement of the ventilator units with respect to the shelter. As seen in this view, each of the shelter exhaust ducts 42' is constructed integrally with the ceiling 14' of the shelter and is provided with a horizontal section 170 whereby the ends of the ducts are offset from each other. This construction has the advantage of providing a trap for any radioactive solids which might enter the upper end of the ducts thus preventing contamination of the interior of the shelter. It will be seen also that in this modification, the motor exhaust lines 168' terminate inside the shelter area 24' rather than connecting directly with the atmosphere. By means of conventional expansion nozzles 172 at the terminal ends of the exhaust lines 168', the cooling effect of the expanding exhaust air may be taken advantage of. Valves 174 upstream of the nozzles and located in the shelter permit the occupants therein to adjust air pressure delivered to the nozzle and thus adjust the cooling effect. By proper manipulation of valves 174 in lines 168' and valves 60' in lines 56', the desired combination of fan speed and cooling effect, within limits, can be achieved.

The above-described arrangement of a fallout shelter, air-operated equipment therein and air compressors has a number of advantages which together provide for the safe, economical and effective protection of persons from fallout. In particular, the use of compressed air motors, as above-described, results in a very flexible ventilating, cooking and lighting system wherein only simple controls are required and wherein each power-consuming device can be operated easily at the expense of the others, if necessary.

The operation of the mechanical components described above to effect the protection of persons within the shelter and to provide them with necessary air, heat and light is readily apparent from the above description. It is contemplated that upon the sounding of a disaster warning, compressor unit 34 or 36 will be already in place in area 28 and may be immediately activated to compress air into tanks 32 and 110. If permanent compressor units 34 have not been installed or if mobile compressor units 36 are not already in place, mobile units will be obtained as rapidly as possible and lowered into area 28 along ramp 122 by means of hoist 130. The units may then be readied for operation even by relatively unskilled persons by connecting the couplings 78, 100, 108, and 118. Once the tank 32 and any additional storage tanks have been pressurized, the system will be in a standby condition awaiting whichever service, ventilation or electric current production, is required of it. As stated above, the entire air output of the compressor 70 can be directed, if needed, through tank 32 and valve 82 to the air motors 162 of the ventilator units 38. If less ventilation is required or if some current production is needed, valve 85 is opened and either valve 82 or valves 60 are partially closed so as to permit sufficient air flow to motor 80.

During operation of the ventilator units 38, outside air will be drawn through filter 52 into duct 50, through opening 50a and thence through areas 24 and 28 into ducts 42. From the top of ducts 42, the air will pass through fan inlet 144, fan 152 and air discharge passage 158. Simple manipulation of valves 60 will control the speed of the fans and thus the passage of air through the areas 24 and 28. If the exhaust lines 168' of the fan motors extend into the shelter as shown in FIGURE 5, some cooling of the interior of the shelter can be effected by allowing the air to expand through nozzles 172. Obviously, the pressure differentials between lines 56' and 168' and between lines 168' and the interior of the shelter determine the speed of the fans and the amount of cooling achieved.

The function of the air supply fan 49 is to aid in drawing air into the inlet end of duct 50. Normally, the operation of ventilator units 38 will effect proper air flow down duct 50 and operation of air supply fan 49 may not be required. Occasionally, however, the air pressure inside the shelter may drop slightly with the result that the fans 152 in venilator units 38 are not fully effective. In this event, operation of supply fan 49 to discharge additional air into the shelter through opening 50b will raise the air pressure within the shelter and restore the effectiveness of the ventilator units 38. In the event the ventilator units 38 become inoperable, as by blast damage thereto, the air supply fan 49 will, by itself, provide air to the interior of the shelter.

In the event that the outside atmosphere contains insufficient oxygen due to nearby fires or is contaminated with poisonous fumes, stored air from tanks 32 and 110 can be discharged into the living area 24 through valves 59. At the same time, ducts 50 and 94 and line 106 will be closed by means of dampers 51 and 94a and valve 106a, respectively, in order to prevent outside air from passing through them into the shelter. Stored air entering through valves 39 not only provides fresh air for breathing purposes, but also slightly pressurizes the shelter to effect the passage of foul air upwardly through ducts 42 and to prevent the seepage of outside air into the shelter.

One of the important advantages of the present system is its simplicity of operation in the absence of a conventional source of electric current. It is generally assumed that a power failure will occur during a disaster period, and any large shelter which is to be inhabited by large numbers of persons for a period up to two weeks must include some means for providing power. Conventionally, standby power-generating equipment is provided in the form of electric generators driven by gasoline or diesel engines. The current supplied by these systems is automatically fed into the wires of the building for whatever use is required of it. It is apparent, however, that such systems require considerable supervision by skilled persons if they are to operate effectively. The systems additionally require load protection devices to assure that the generators will not burn out if overloaded.

On the other hand, the production of compressed air by engine-driven compressors is relatively simple and requires little supervision. Mobile units, such as those conventionally used with pneumatic hammers, require little supervision and present no technical problems concerned with overloading. Obviously, the only effect of overloading an air compressor is a drop in output air pressure. While some technical knowledge is required for the operation of conventional engine-driven compressors, many persons have the requisite knowledge as a result of the widespread use of these machines. Further, it is reasonable to expect that the operators of mobile machines would accompany them to the shelter in the event of a disaster warning.

Further, the use of mobile engine-driven air compressors takes advantage of the ready availability of these units. Cooperation between construction companies and civil defense authorities could result in the storage of the units in fallout shelters when not in use by their owners, thus materially reducing the initial cost of the shelter. Conventional engine-driven electric generators, being not nearly so common, would normally have to be purchased outright and would add considerably to the cost of the shelter.

A further advantage of the air compressor system of the present invention lies in the use of the air accumulator tank 32, which is typically a part of a compressor unit, as an emergency supply of air.

One of the advantages of providing the ventilator units 38 with air motors 162 is the ease with which speed control may be effected over a wide range. Occupants of the living area may readily adjust the speed of any of the motors 162 from zero to maximum by manually adjusting valves 60. If the same control were to be obtained with electric motors, costly variable speed motors and complicated controls therefor would be required.

A further advantage associated with the air motors 162 for operating the fans and the air motor 80 for operating electric generator 40 is the characteristic that overloading the motors cannot cause them to overheat; an overloaded air motor merely stalls, without damage thereto. Additionally, air motors cannot ignite combustible gases which might be present after a disaster, as a result of for example, broken gas mains. Still further, air motors are not liable to damage by a fire storm as are electric motors.

A still further advantage associated with the use of air motors is that they may be driven at high speeds thereby permitting the use of smaller fans than would be used in combination with relatively slow speed electric motors. Smaller fans, of course, represent a lower initial cost for the shelter. In addition, the high-speed air motors are smaller and less costly than electric motors capable of performing the same functions.

The combination of air-driven fans and electric generator with the air compressor unit provides a very flexible system wherein any of the air-driven machinery may be operated at the expense of the others. If necessary, without complicated and costly control equipment. Since the power operating equipment is desirably kept at a minimum in order to reduce the cost of the shelter, it ordinarily will not be possible to operate the ventilating, cooking and lighting facilities at full capacity simultaneously. However, with the present arrangement, the compressed air to the ventilator units 38 can be easily and simply cut down by partially closing valves 60 thereby allowing operation of the air motor 80 for generator 40. Similarly, if the air supply to motor 80 is cut off, more air will be available to operate the ventilator units 38.

A large economic advantage results from the combination of a high speed air motor with a high frequency electric generator because of the size and cost of this type of generator. The high frequency 3 kva. generator referred to above, for example, can be purchased for about one half the cost of a conventional 60 cycle, 2 kva. generator. Further, the high frequency generator is considerably smaller than its 60 cycle counterpart and represents a savings in space within the shelter.

The use of fluorescent lights in combination with a high frequency generator in the present invention presents several advantages. The number of lights may be reduced from that normally required because the lumen capacity and efficiency of fluorescent tubes is increased substantially as the operating current frequency is increased. The cost of the lighting fixtures is less because starters for the tubes may be eliminated and the size of the ballast may be reduced by as much as fifty percent. The latter features provide a still further advantage in the much reduced heat output of the fixtures. Any reduction in heat added to the shelter reduces the load on the ventilating system and effects a saving of fuel.

Thus, it will be appreciated that the power-generating and power-consuming system described above provides versatility and efficiency of operation without danger of overloading and without the use of costly control equipment.

While the shelter described above has been illustrated as being constructed of concrete below ground, it is apparent that the ventilation system and the electric power system of the present invention are applicable to shelters constructed of other materials in other locations. The shelter may be above ground and constructed of any suitable material, or it may be an existing building or portion of an existing building. Further, the ventilating fans and air supply fans may vary as to their particular design and location, it being desired only to effect the versatile and efficient system described. For example, in a shelter in the basement of an existing building, ventilator fans could be installed intermediate the ends of the exhaust duct. Obviously, also, the location of the compressors, electric generators and air and fuel tanks will vary with the nature of the particular shelter structure which is available. It is contemplated, also, that the various air lines and headers may be rigid or flexible as necessary to make the desired connections.

What is claimed is:

1. A personnel radiation shelter adapted to house a plurality of persons for an extended period of time comprising: radiation resistant walls defining an enclosure for personnel and equipment; at least one air inlet duct opening into said enclosure and extending to the atmosphere outside said enclosure; at least one air exhaust duct extending from said enclosure to the atmosphere outside said enclosure; an exhaust fan associated with said exhaust duct; an air motor drivingly connected to said exhaust fan and having a compressed air inlet and an exhaust air outlet, the latter being open to said enclosure; air compressor means disposed within said enclosure and having an air inlet and an air outlet; a compressed air storage tank; conduit means connecting the outlet of said compressor means with said storage tank and with the inlet of said air motor; valve means associated with said conduit means for selectively directing compressed air from said compressor means outlet to said storage tank and to the inlet of said air motor; additional valve means for discharging compressed air from said storage tank into said enclosure; conduit means extending from the inlet of said compressor means to the atmosphere outside said enclosure and provided with an air filter for removing radioactive dust; an internal combustion engine within said enclosure drivingly connected to said air compressor means, said internal combustion engine having air and exhaust conduits communicating with the atmosphere outside said enclosure.

2. A radiation shelter as in claim 1 further including an inlet fan in said air inlet duct and an air motor drivingly connected to said inlet fan and connected to receive compressed air from said air compressor means.

3. A radiation shelter as in claim 1 further comprising: an electric generator within said enclosure and an air motor drivingly connected to said generator and connected to receive compressed air from said air compressor means.

4. A radiation shelter as in claim 3 wherein said generator is a high frequency generator producing electric current above 400 cycles per second whereby for a given amount of electric power output a savings of space within said enclosure may be realized by virtue of the relatively small size of high frequency generators.

References Cited by the Examiner

UNITED STATES PATENTS

| 2,097,723 | 11/37 | Ewing | 62—401 X |
|---|---|---|---|
| 2,140,787 | 12/38 | Cornell | 98—33 |
| 2,188,566 | 1/40 | Cowderoy-Dale | 98—29 |
| 2,526,290 | 10/50 | Solzman | 98—43 |
| 2,878,665 | 3/59 | Crabbe. | |
| 2,987,983 | 6/61 | Solzman | 98—43 |

FOREIGN PATENTS

| 918,247 | 9/54 | Germany. |
|---|---|---|
| 304,751 | 4/55 | Switzerland. |

ROBERT A. O'LEARY, *Primary Examiner.*

ALBERT H. KAMPE, *Examiner.*